(12) United States Patent
Dulaney et al.

(10) Patent No.: US 7,982,747 B1
(45) Date of Patent: Jul. 19, 2011

(54) DISPLAYING GENERATED CHANGES TO AN IMAGE FILE

(75) Inventors: Marissa Dulaney, Morgan Hill, CA (US); Elwan S. Johnson, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 376 days.

(21) Appl. No.: 11/313,122

(22) Filed: Dec. 19, 2005

(51) Int. Cl.
G09G 5/00 (2006.01)

(52) U.S. Cl. .......................... 345/619; 382/309; 382/311

(58) Field of Classification Search .................. None
See application file for complete search history.

(56) References Cited

U.S. PATENT DOCUMENTS

| | | | |
|---|---|---|---|
| 5,463,730 A | 10/1995 | Hatada | |
| 5,485,565 A | 1/1996 | Saund et al. | |
| 5,548,663 A | 8/1996 | Sekine et al. | |
| 5,586,239 A | 12/1996 | Ueda | |
| 5,659,639 A | 8/1997 | Mahoney et al. | |
| 6,184,860 B1 | 2/2001 | Yamakawa | |
| 6,202,073 B1 * | 3/2001 | Takahashi | 715/204 |
| 6,448,956 B1 * | 9/2002 | Berman et al. | 345/156 |
| 6,567,830 B1 | 5/2003 | Madduri | |
| 6,701,844 B1 * | 3/2004 | Roy | 101/483 |
| 6,724,435 B2 * | 4/2004 | Segman | 348/576 |
| 6,791,709 B1 | 9/2004 | Nakamura et al. | |
| 6,795,209 B1 | 9/2004 | Patton et al. | |
| 6,873,336 B1 * | 3/2005 | Sailus et al. | 345/581 |
| 6,879,717 B2 | 4/2005 | Aggarwal et al. | |
| 6,931,633 B1 * | 8/2005 | Vazquez et al. | 717/131 |
| 6,956,966 B2 * | 10/2005 | Steinberg | 382/167 |
| 6,993,719 B1 * | 1/2006 | Edwards et al. | 715/706 |
| 7,193,634 B2 | 3/2007 | Suzuki et al. | |
| 7,254,270 B2 | 8/2007 | Simske | |
| 7,342,695 B2 * | 3/2008 | Matsugi | 358/531 |
| 2002/0172498 A1 * | 11/2002 | Esenyan et al. | 386/69 |
| 2003/0174146 A1 * | 9/2003 | Kenoyer | 345/619 |
| 2004/0120596 A1 | 6/2004 | Ishii et al. | |
| 2004/0169873 A1 * | 9/2004 | Nagarajan | 358/1.9 |
| 2004/0230966 A1 * | 11/2004 | Morris et al. | 717/169 |
| 2005/0212817 A1 | 9/2005 | Cannon et al. | |
| 2005/0233296 A1 | 10/2005 | Ziv-el et al. | |

FOREIGN PATENT DOCUMENTS

JP 08263688 10/1996

OTHER PUBLICATIONS

Rother et al. "'GrabCut'—Interactive Foreground Extraction using Iterated Graph Cuts." Microsoft Research Cambridge, UK.
Ono, Philbert. "Print Club—Japan's photo sticker fad." PhotoGuide Japan A Guide to Photography in Japan. NewsZone. Jun. 2001. http://photojpn.org/news/modules.php?op=modload &name=Sections&file=index&req=viewarticle&artid=1&page=1.
Reese et al. "Image Editing with Intelligent Paint." Dept. of Computer Science, Brigham Young U., Provo Utah. The Eurographics Association. 2002.

* cited by examiner

*Primary Examiner* — Said Broome
(74) *Attorney, Agent, or Firm* — Van Pelt, Yi & James LLP (57) ABSTRACT

Editing an image file is disclosed. Editing includes generating a plurality of machine generated changes to the image file, individually displaying each of the plurality of machine generated changes, and selectively implementing at least one of the plurality of machine generated changes.

22 Claims, 8 Drawing Sheets

| Metadata | Current | Recommended |
|---|---|---|
| Time | 10:00pm | 10:00am |
| Description | Indoors | Outdoors |
| Tags | Pets | Pets, Socks, Flowers, Cat |
| Object (704a) | Description =<br>Location =<br>Names =<br>Tags = | Description = Cat<br>Location = x<br>Names = Socks<br>Tags = Cat, Socks |
| Object (704b) | Description =<br>Location =<br>Names =<br>Tags = | Description = Cat<br>Location = y<br>Names =<br>Tags = Cat |
| Object (704c) | Description =<br>Location = z<br>Names =<br>Tags = Otto | Description = Car<br>Location = z<br>Names =<br>Tags = Otto, Car |

| Metadata | Current | Recommended |
|---|---|---|
| Time | 10:00pm | 10:00am |
| Description | Indoors | Outdoors |
| Tags | Pets | Pets, Socks, Flowers, Cat |
| Object | Description =<br>Location =<br>Names =<br>Tags = | Description = Cat<br>Location = x<br>Names = Socks<br>Tags = Cat, Socks |
| Object | Description =<br>Location =<br>Names =<br>Tags = | Description = Cat<br>Location = y<br>Names =<br>Tags = Cat |
| Object | Description =<br>Location = z<br>Names =<br>Tags = Otto | Description = Car<br>Location = z<br>Names =<br>Tags = Otto, Car |

FIG. 7B

DISPLAYING GENERATED CHANGES TO AN IMAGE FILE

BACKGROUND OF THE INVENTION

Digital photographs may be edited using an image editing application. For example, a photograph may be edited in order to fix perceived problems with the photograph, such as red eye, portions being too light or dark, or a color cast on the photo. Some digital photo editing tools include an automatic fix mechanism that attempts to correct multiple problems with the photo. For example, a user may select an "automatic fix" button, which causes these problems to be automatically corrected with one click.

When the automatic fix mechanism runs, the user does not necessarily know the individual problems that were detected and what was done to correct each problem. Exactly what the machine fixes, and the degree of the fix, may not be what the user wanted. Perhaps the user feels that the automatic mechanism makes the photo too bright, or the user wants the automatic mechanism to make the photo darker, but not change the colors. The user cannot specify these things before the automatic mechanism completes the "fix." The user is therefore forced to (1) accept what the machine gives them, (2) undo and start from scratch with a manual process, or (3) make additional adjustments to the new version of the photo, which may reduce image quality. Moreover, the user does not know where in the photo the fixes are being applied, nor does the user have control over this area. In addition, the user feels a lack of control, which leads to dissatisfaction. Thus, an improved method of editing an image file is needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
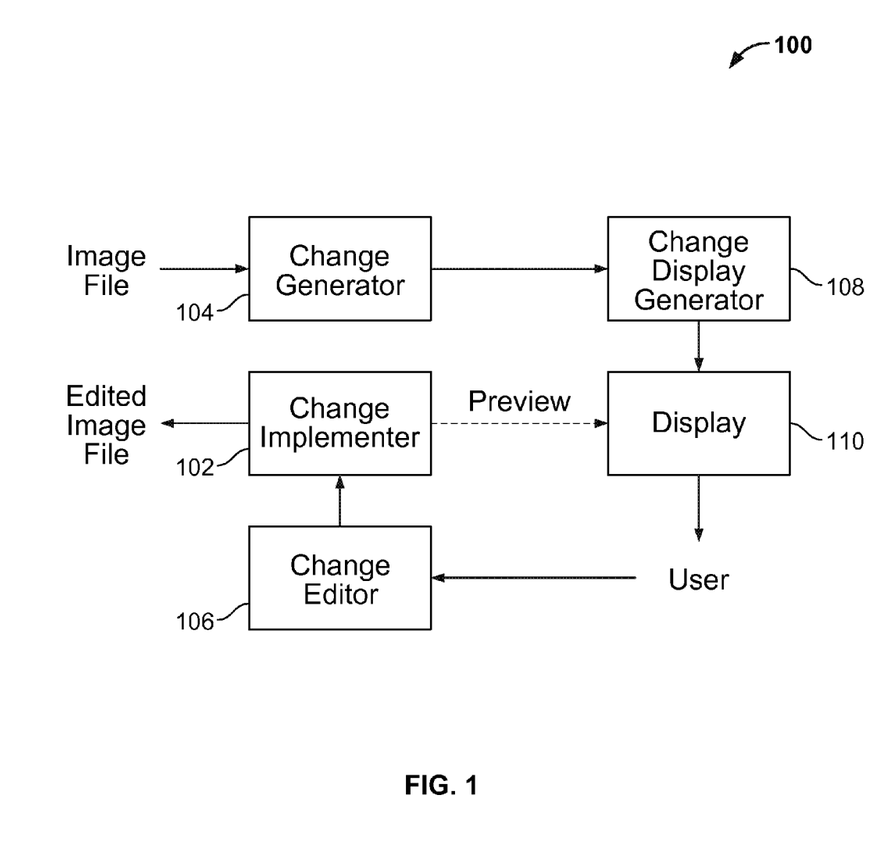
FIG. 1 is a block diagram illustrating an embodiment of a system for editing an image file.

FIG. 1 is a block diagram illustrating an embodiment of a system for editing an image file. In the example shown, an image file is provided to change generator 104. The image file may include a photograph or other image file in any appropriate format, such as JPEG, TIFF, or BMP. Change generator 104 analyzes image file 112 to determine a plurality of changes to the image file. For example, change generator 104 may detect problems with a photograph, such as red eye, color, or contrast problems. Other problems with a photograph may include metadata problems. Examples of image file metadata include tags, date, time, camera make and model, photographer, subjects or objects in the photo, etc. A tag, as used herein, refers to text or data that is associated with the photo or objects in the photo. Tagging refers to the process of assigning a tag. For example, a user or machine may tag a photo of a person. The tag may include the name of the person or other information related to the person. The tags associated with a photo may be inconsistent. A user may have tagged a photo "color" when the photo is black and white. A user may have tagged a photo "Bob" when the subject is "Mary." In this case, a facial detection and recognition techniques may have been used to determine that the tag should be changed to "Mary."

For each detected problem, one or more changes may be recommended. A change may be recommended to fix two or more detected problems. For example, if red eye is detected, a recommended change might include fixing the red eye. If a portion of a picture is too bright, a recommended change might include darkening that portion of the picture. A recommended change may correspond to two or more detected problems.

Change generator 104 provides a plurality of generated changes to graphical change display generator 108. Graphical change display generator 108 interprets the changes and displays the changes on display 110, where display 110 may comprise a computer monitor, laptop display, or other display. The changes may be displayed in various ways in various embodiments. Some examples of how the changes may be displayed are more fully described below.

A user may view the changes in display 110, and then use change editor 106 to provide input to change implementer 102 regarding at least one of the plurality of changes. In some embodiments, system 100 is implemented in a photo editing application and an interface is provided for the user to make changes. For example, the user may modify or reject one or more of the recommended changes that are displayed. For example, the user may edit the percentage by which a portion of a photo is darkened or lightened. In some embodiments, one or more changes can be previewed so that the user can see what the recommended change would look like if it is applied. This may enable the user to make a better decision as to which changes to modify, if any, where modifying includes editing, deleting, accepting, or rejecting. Change implementer 102 may be used to implement a change for preview in display 110. In some embodiments, the preview may be toggled on or off, so that the photo before or after recommended change(s) are applied can be viewed.

Change implementer 102 selectively implements one or more of the changes. In some embodiments, change implementer 102 implements the changes generated by change generator 104 as modified by the user. Change implementer 102 may communicate with change generator 104 to coordinate or obtain information, depending on the implementation. Change implementer 102 provides an edited image file as output.

Figure 2:
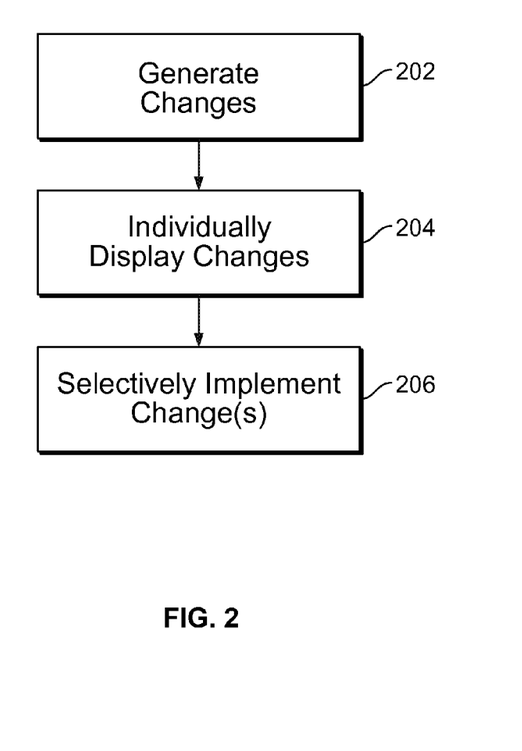
FIG. 2 is a flowchart illustrating an embodiment of a process for editing an image file.

FIG. 2 is a flowchart illustrating an embodiment of a process for editing an image file, such as a photograph. For example, this process may be implemented on system 100. In the example shown, changes are generated at 202. For example, the image is analyzed, and a set of recommended changes is determined. For example, the image may be analyzed for shadows, highlights, lighting levels, color cast, color or white balance, contrast, saturation, sharpness, edges, red eye, skin tone, noise, etc. The image may be analyzed for portions that need to be patched or healed (e.g., a facial blemish or scratch in a scanned photo), objects that should be removed (e.g., a carpet stain, hair sticking out, an ex-boyfriend), teeth that should be whitened, portions that may look better cropped, etc. For example, faces may be found using facial detection techniques and teeth may be detected by first detecting eyes and then searching for a white or light colored region under the eyes.

In addition, metadata changes may be generated. For example, a photo that is dated 11:00 am that is dark or depicts a night scene may generate a recommended change of time (or lightening of the image). Objects may be detected and this may generate a recommended change to metadata of the photo, such as objects, people, or tags associated with the photo. For example, faces may be detected and recognized. Faces that are detected may generate a recommended tag of "face" and faces that are detected and recognized may generate a recommended tag of the name corresponding to the face that was recognized.

In some embodiments, changes are generated based at least in part on preferences. In some embodiments, changes are generated based at least in part on previous user behavior. For example, a change generator may be trained to recognize faces or other objects based on how the user previously identified one or more faces or objects. In some embodiments, process 202 is performed by change generator 104.

Changes are individually displayed at 204. In some embodiments, for each change, what the change will be, the amount of change, if applicable, and the region of the image that will be affected are displayed. For example, the change may be to darken a portion of a photo by 10%, where 10% is the amount of change. The change may be to remove a color cast, which may not be associated with an amount of change.

In some embodiments, the changes are displayed on the image so that a user can see which portions of the image would be affected by each recommended change. The changes may be displayed as markings and/or text superimposed on the image. For example, the image may be segmented into regions that are associated with the recommended changes. An indication of what changes are recommended for each region may be displayed. The indication may be displayed in a variety of ways. For example, a region may be outlined or circled and an arrow may point to the outline. At the foot of the arrow, text describing the recommended change(s) to that region may be displayed. Regions may overlap. A region may be indicated by any shape. For example, a region may be indicated by a circle, a rectangle, or a shape that roughly outlines an object in the photo. Changes to the entire photo may be indicated by an arrow pointing to an entire photo, displayed without indicating a region, or displayed in any other appropriate way, such as on the side of the photo or in a separate window.

Changes may be displayed using markings. A marking on an image, as used herein, refers to any graphical marking on an interface displaying the image. A marking may include one or more markings. The interface may include, for example, a graphical or other user interface to an image editing application. The marking may be superimposed on the image, adjacent to the image, or anywhere in the interface. A marking could include a markup, a gesture, and/or text. For example, a marking could include a circle drawn around a pair of eyes next to the text "Remove red eye."

A gesture may include a marking that is associated with a change. For example, "X" may be a gesture associated with the change "delete." An "X" drawn over an object in a photo may indicate that removal of the object is recommended.

Parameters related to the recommended changes may also be displayed. For example, if a recommended change is to darken a portion of a photo by 15%, the text "darken 15%" may be displayed. In some embodiments, the user may adjust the parameters. For example, clicking on the text "darken 15%" may allow the user to edit the percentage directly, or open a window that allows the user to edit the percentage or select a percentage from a menu.

Parameters related to the recommended changes may be edited. The recommended change or the change(s) to apply may be edited. For example, the user may change the text "darken 15%" to any of the following: "darken 20%," "lighten 15%," "darken 15% and remove red eye," or "remove red eye." The region may also be changed. For example, the user may use a mouse to drag an outline of a region to change its size or shape. The user may shift an outline of a region.

In some embodiments, process 204 is performed by change display generator 108. In some embodiments, each change is accepted or rejected. In some embodiments, the user rejects some changes, edits some changes, and all other changes are accepted by default.

Changes are selectively implemented (or applied) at 206. In some embodiments, all accepted changes are implemented. In some embodiments, all displayed changes are implemented. For example, the user was presented with machine recommended changes, edited a subset of the changes, and deleted a subset of the changes. The remaining changes after edits are implemented. In some embodiments, process 206 is performed by change implementer 102.

Figure 3:
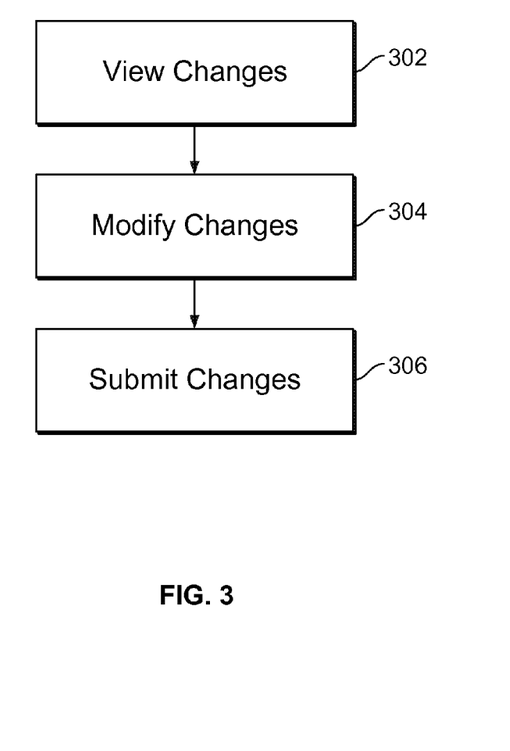
FIG. 3 is a flowchart illustrating an embodiment of a process for editing an image file.

FIG. 3 is a flowchart illustrating an embodiment of a process for editing an image file. For example, this process may be implemented by a user and processed by system 100. In the example shown, changes are viewed at 302. For example, the changes displayed at 204 are viewed by a user. Changes are modified at 304. Modifying may include deleting or editing a change. For example, a user may select each of the regions and delete or edit a change associated with the region. For example, a user may choose to edit a subset of the changes and delete a subset of the changes. Editing may include changing a parameter associated with a change (e.g., changing "darken 10%" to "darken 15%"), changing the change itself (e.g., changing "darken" to "lighten" or to "sharpen"), or adding a change (e.g., changing "darken 10%" to "darken 10% and sharpen"). Changes are submitted at 306. In some embodiments, process 304 is performed using change editor 106. For example, a user may click on a "Go" or an "Apply" button. In some embodiments, changes may be applied individually. For example, a user may apply each change one after another. Similarly, each change can be individually undone (e.g., by clicking an "Undo" button). In some embodiments, the changes are then selectively implemented at 206.

Figure 4:
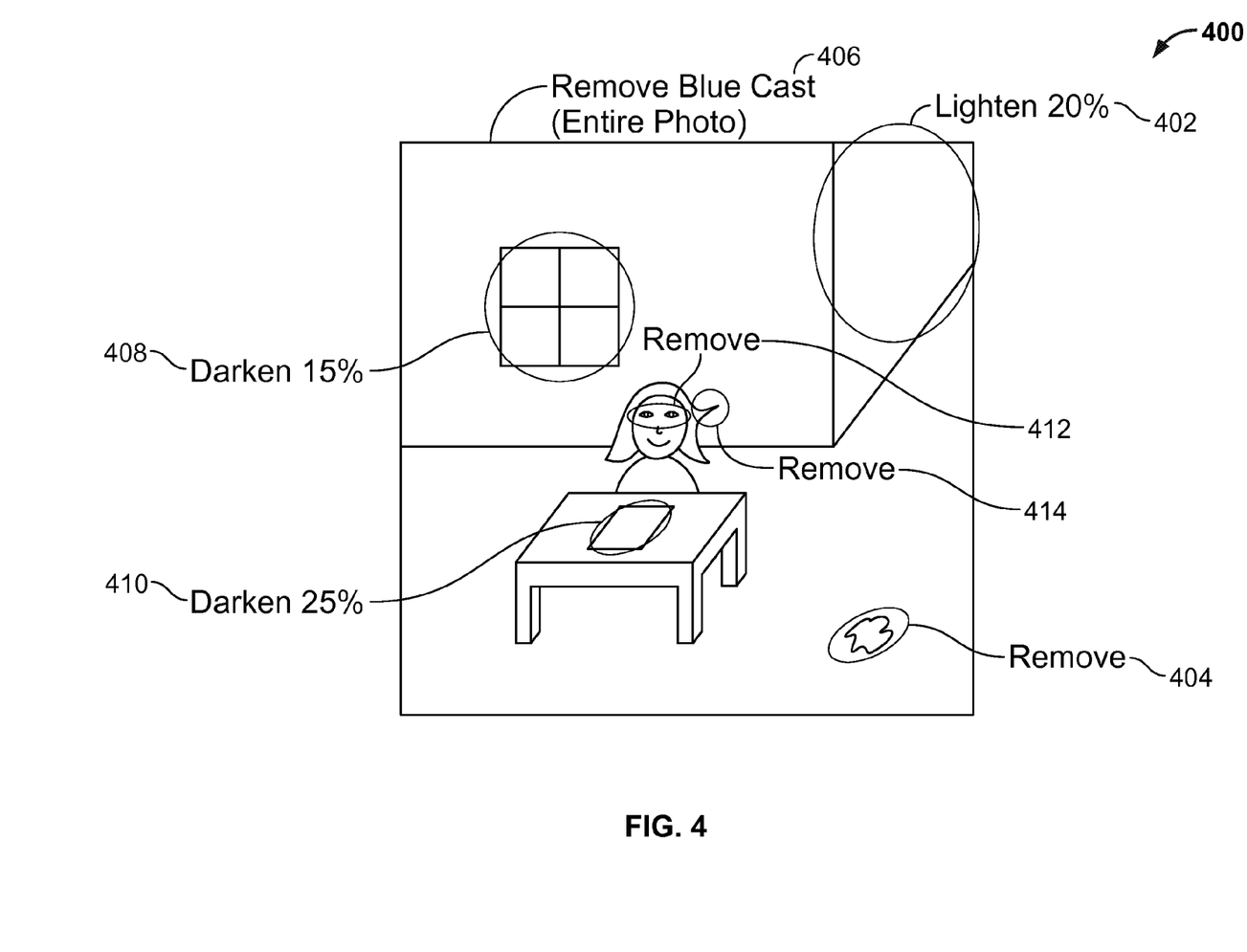
FIG. 4 is a diagram illustrating an embodiment of a display of recommended changes to a photo.

FIG. 4 is a diagram illustrating an embodiment of a display of recommended changes to a photo. In the example shown, photo 400 is shown to include recommended changes 402-414. For example, changes 402-414 may have been generated at 202. In some embodiments, such a display is presented to a user at 204.

In this example, changes 402-414 are indicated by markings and text on the photo. Change 402 is indicated by a line between a circle that roughly outlines a region of the photo and the text, "Lighten—20%." For example, the region is a hallway that may be too dark. The text "Lighten—20%" may indicate that the recommended change is to lighten the hallway by 20%. Change 406 is indicated by a line between the text "Remove Blue Cast (entire photo)" and an outline of the entire photo. For example, the photo may have a blue cast and the recommended change is to remove the blue cast. Change 404 is indicated by a circle around a dark spot with the text "Remove." For example, there may be a dark spot, such as a floor stain in the photo and the recommended change is to remove the spot. Change 408 is to darken a window by 15%. Change 410 is to darken a piece of paper by 25%. Change 412 is indicated by a circle around a pair of eyes and the text "Remove," indicating that removal of red eye is recommended. In some embodiments, the text may say "Remove red eye." Change 414 is indicated by an oval around a piece of hair sticking out, indicating that removal of that piece of hair is recommended.

In some embodiments, a user views display 400 at 302. The user may then choose to modify changes at 304. For example, the user may disagree that spot 404 should be removed. Spot 404 may be part of a floor design. In this case, the user may delete change 404. The user may realize that the piece of paper is a gray sheet of paper and that it should be darkened by 30%. The user may modify change 410 so that the darkening factor is 30%.

In some embodiments, the user may preview a change. For example, before deciding to modify change 410 so that the darkening factor is 10%, the user may preview darkening factors of 25%, 30%, and 35% to determine which one looks the best.

Various user interfaces may be used to allow a user to view, modify, and submit changes. For example, the changes may be shown in a list on the side of the image. The list may be numbered and reference numbers on the image may be used to indicate regions of the image. Alternatively, the list may describe the regions using text (e.g., "remove red eye on face" or "remove red eye on Bob," if Bob is a face that has been detected in the image), so that the photo is not covered by markings and/or text. In another example, the changes may be displayed one by one, allowing the user to preview, accept, or reject each change. In some embodiments, the markings and/or text on the photo may be toggled on or off. In other words, the photo can be viewed with or without markings on the photo.

Figure 5:
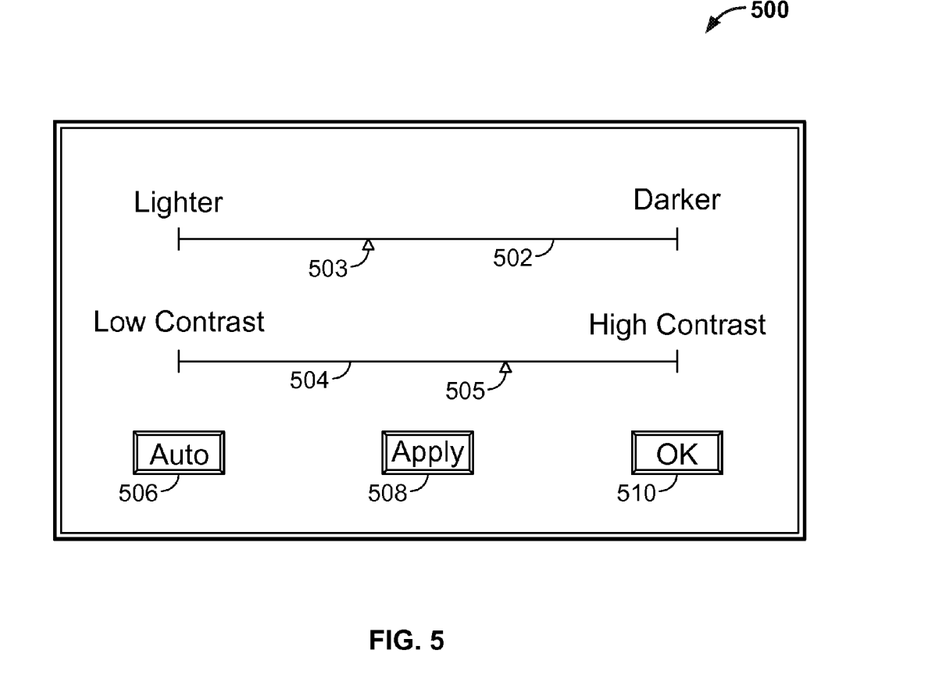
FIG. 5 is a diagram illustrating an embodiment of a user interface for modifying a change.

FIG. 5 is a diagram illustrating an embodiment of a user interface for modifying a change. For example, interface 500 may open when one of changes 402-414 is selected (e.g., by single or double clicking on a change, or clicking on a change with a right mouse button). Interface 500 may also appear on the side of or float over the image. Interface 500 may already be open and displayed on the side.

In this example, two changes associated with a portion (or region) of an image are shown, where the portion of the image may include the entire image. For each change, a slider bar is shown. Slider bar 502 allows the brightness of the region to be adjusted. For example, a user may select slider 503 with a mouse and drag it to the right to darken the region and to the left to lighten the region. Slider bar 504 allows the contrast of the region to be adjusted. For example, a user may select slider 505 with a mouse and drag it to the right to increase the contrast and to the left to decrease the contrast. "Auto" button 506, "Apply" button 508, and "OK" button 510 are shown at the bottom. Selecting "Apply" button 508 causes the currently displayed adjustment to be applied. Selecting "Auto" button 506 causes the sliders to automatically adjust to a setting according to a predetermined automatic adjustment technique. Selecting "OK" button 510 causes the window to close and the displayed adjustment to be saved but not applied. For example, the user may make individual modifications to a plurality of changes, opening a window similar to window 500 for each change, and then selecting "OK" to close each window. After making all the desired changes, the user may select a button that causes all changes to be applied (or implemented).

In various embodiments, various interfaces may be used. For example, numerical values may be used to input brightness or contrast levels. Numerical values may be shown in place of or in addition to slider bars. Other buttons could be included, such as a cancel button. Buttons 506-510 are optional. For example, "Auto" button 506 and "Apply" button 508 are optional. In some embodiments, when the window is first opened, the automatic settings are the current settings. The user may then select the "Apply" button to view the automatic settings as applied.

Figure 6:
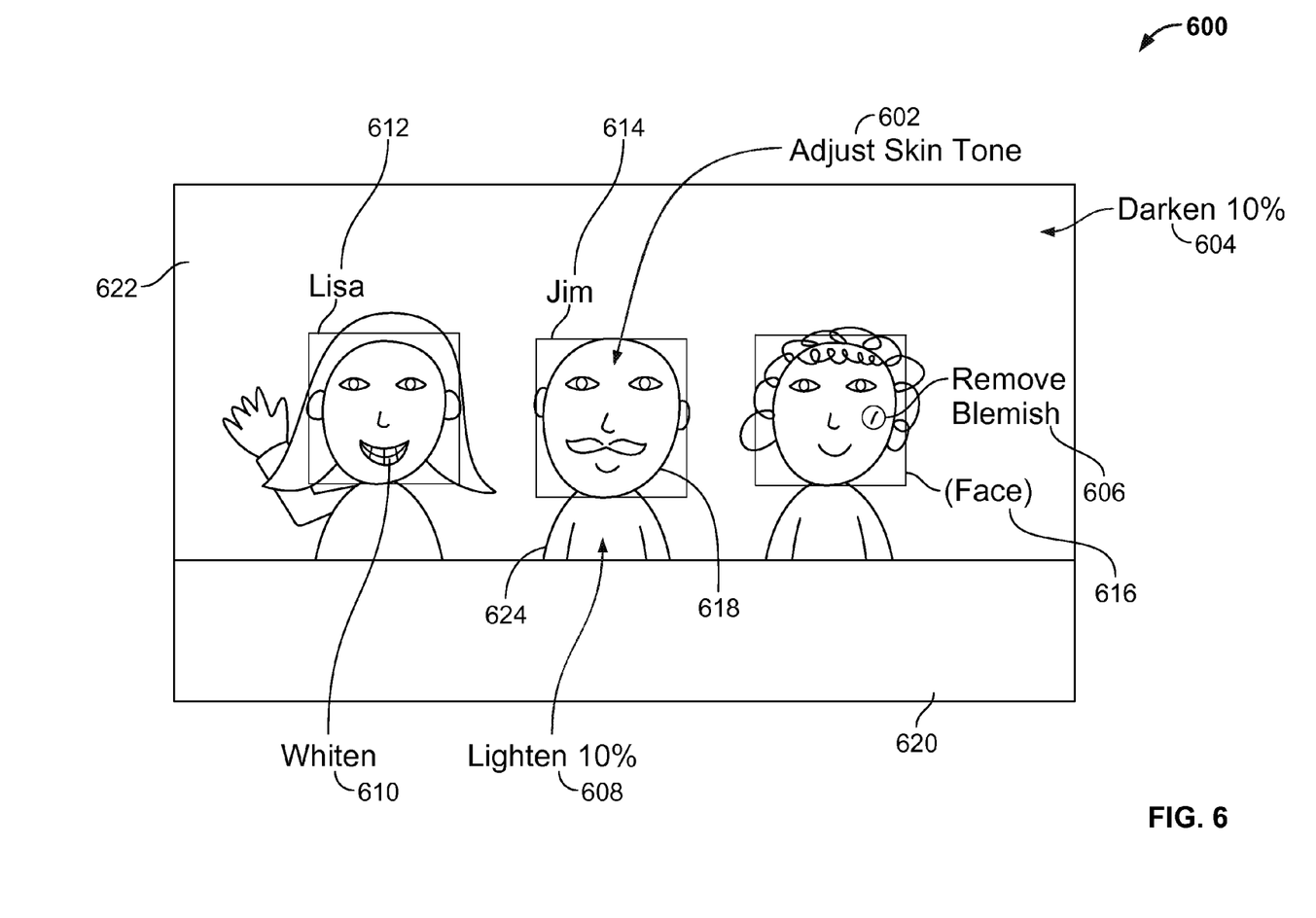
FIG. 6 is a diagram illustrating an embodiment of a display of recommended changes to a photo.

FIG. 6 is a diagram illustrating an embodiment of a display of recommended changes to a photo. In the example shown, photo 600 is shown to include recommended changes 602-616. For example, changes 602-616 may have been generated at 202. In some embodiments, such a display is presented to a user at 204. The subject of photo 600 is three people sitting behind table 620. The background of the photo is wall 622.

Change 602 is indicated by an arrow from the text "Adjust skin tone" to face 618. If change 602 is implemented, the skin tone of face 610 will be adjusted. In some embodiments, the change may be adjusted. For example, parameters associated with adjusting the skin tone may be modified, such as the degree to which the skin tone is modified. Various interfaces may be provided for adjusting the change. For example, single or double clicking on face 618 or the text "Adjust skin tone," or selecting change 602 from a list or a menu, may open an interface, such as interface 500, for adjusting parameters associated with the change.

Change 604 is indicated by an arrow from the text "Darken 10%" to wall 622. If change 604 is implemented, wall 622 will be darkened by 10%. Parameters associated with change 604, such as the current darkening factor of 10%, may be modified by the user. Change 606 is indicated by a line between the text "Remove Blemish" and a circle that outlines a region of the photo. In this case, a facial blemish is located in the region of the photo. If implemented, change 606 will remove the blemish, for example, using a healing or blending technique. Change 608 is indicated by an arrow from the text "Lighten 10%" to shirt 624. If implemented, change 608 will lighten shirt 624. Change 610 is indicated by a line from the text "Whiten" to a person's teeth. If implemented, change 610 will whiten the person's teeth.

Changes 602-610 are graphical changes. Changes 612-616 are metadata changes. For example, change 612 is indicated by a line from the text "Lisa" to a box that roughly surrounds a person's face. In this case, facial detection and facial recognition techniques may have been used to detect and recognize the face as belonging to Lisa. The facial recognition technique may be trained based on previous user input (e.g., the user having previously identified Lisa's face one or more times). If change 612 is implemented, the metadata associated with photo 600 will be updated. For example, the metadata may include a list of faces that have been detected and names or other text associated with each face. In this case, the name or text for this face would be updated to "Lisa." In another example, the name or text for this face may currently be "Tom." For example, it may have accidentally been tagged "Tom" by the user. If change 612 is implemented, the text "Tom" would be replaced with "Lisa." In some embodiments, multiple names can be associated with a face. For example, a person may go by more than one name or members of a family may all be tagged with the same last name (e.g., "Smith"). There may be a recommendation to add, modify, or delete any number of names or other metadata.

If change 614 is implemented, the metadata associated with face 618 would be updated to "Jim." In the case of change 616, a face may have been detected, but not recognized. Thus, change 616 is indicated by a line from the text "(Face)" to a box that loosely surrounds a person's face to show that a face has been detected but not recognized. In various embodiments, such a change may be shown in numerous ways.

Figure 7A:
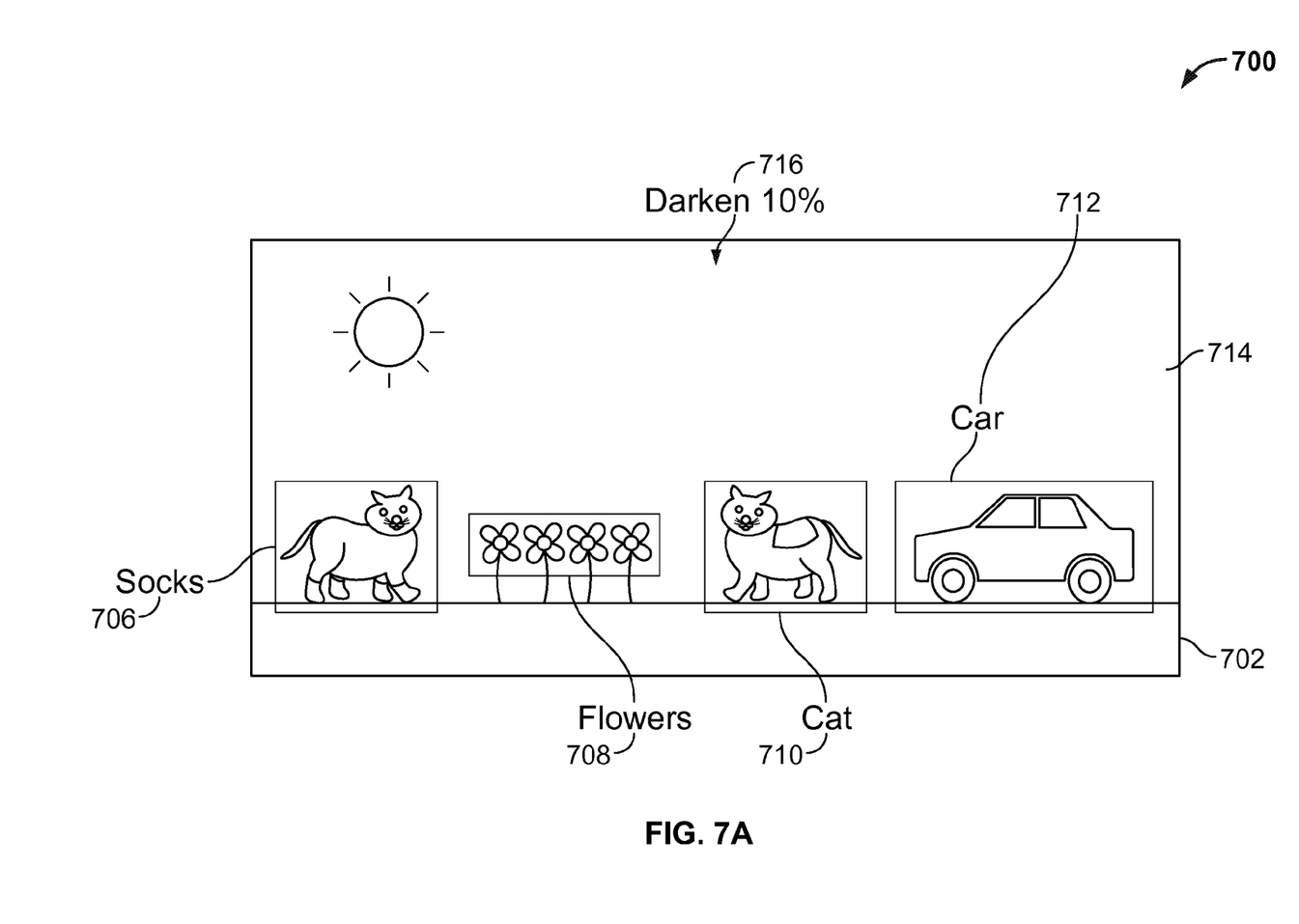
FIGS. 7A-7B illustrate embodiments of a display of recommended changes to a photo.
Figure 7B:
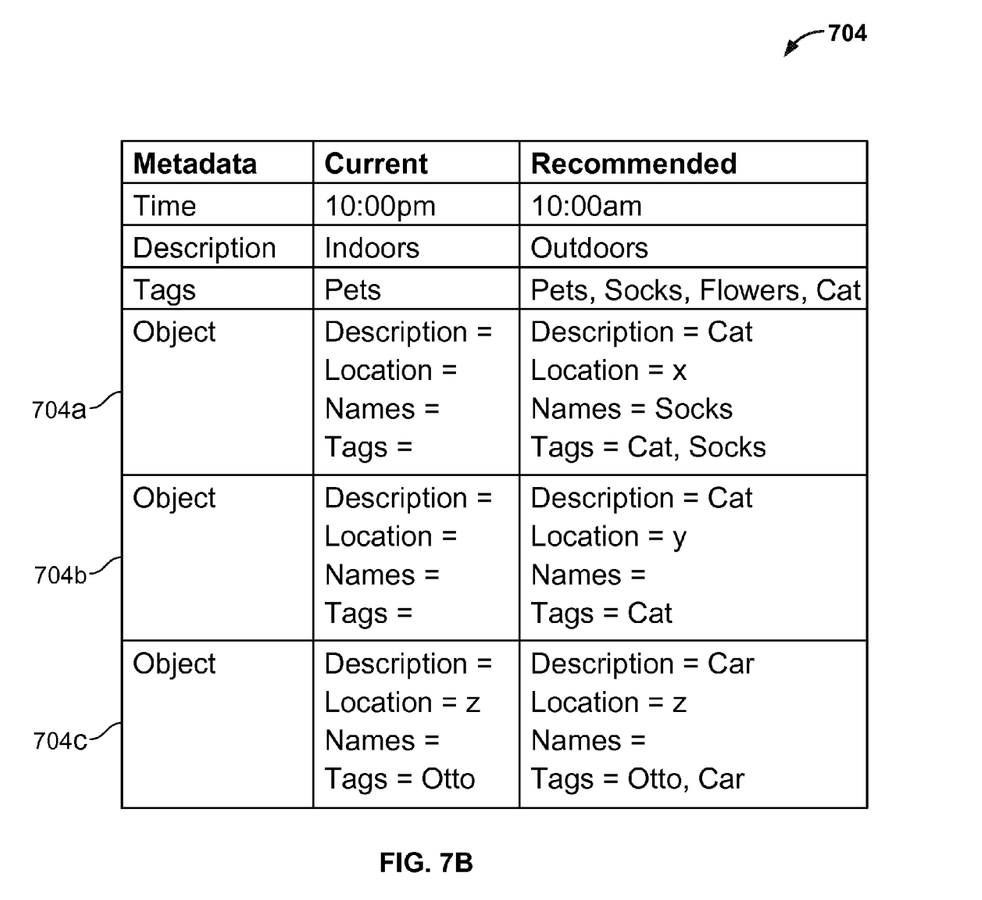

FIGS. 7A-7B illustrate embodiments of a display of recommended changes to a photo. In the example shown, photo 700 is shown to include recommended changes 704-712. For example, changes 704-712 may have been generated at 202. In some embodiments, such a display is presented to a user at 204. The subject of photo 700 is a backyard, including two cats, flowers, and a bicycle. It is a sunny day and background 714 is bright. Changes 704-712 are metadata changes. Change 716 is a graphical change.

Change 716 is indicated by an arrow between the text "Darken 10%" and background 714. If change 716 is applied, background 714 will be darkened by 10%. Change 716 may be modified by the user, as described previously.

Change 708 is indicated by a line between the text "flowers" and a box that roughly encloses flowers in the photo. For example, flowers may have been detected based on a plant or flower detection technique. If change 708 is implemented, file metadata associated with the portion of the photo corresponding to flowers (which may or many not have a current value) may be changed to "flowers." Change 710 is indicated by a line between the text "cat" and a box that encloses a cat in the photo. For example, a cat may have been detected using an animal or cat detection technique. Change 706 is indicated by a line between the text "Socks" and a box that encloses a cat in the photo. For example, a cat may have been detected and then recognized as a cat that has been previously identified as "Socks."

Change 712 is indicated by a line between the text "car" and a box that encloses a bicycle in the photo. A car detection technique may have been used. In this case, a bicycle may have been incorrectly detected as a car. As such, the user may choose to modify change 712 so that the text "car" is replaced with "bike" in the file metadata. Any of changes 704-712 may be modified by the user.

In some embodiments, the changes are not all displayed on the photo. For example, the changes may be shown in a list and/or described in text. In some embodiments, the changes that are not graphical (e.g., metadata changes) are displayed in a list or in a separate window. In some embodiments, one or more changes are displayed both on the photo and in a list or text. For example, metadata changes may be shown on the photo and/or in a list.

Changes 704 include a list of recommended metadata changes, some of which are also shown on the photo. In this example, changes 704 include generated changes for the file metadata "Time," "Description," and "Tags." As shown, it is recommended that the time be changed from "10:00 pm" to "10:00 am." Such a recommendation may be based on detection of the sun, the color of the sky, and/or the brightness level of the photo. Changes 704 also include a recommendation that the description be changed from "Indoors" to "Outdoors." Such a recommendation may be based on detection of typically outdoor elements, such as the sun, the sky, and/or grass. It is also recommended that the tags be changed from "pets" to "pets, Socks, flowers, cat."

In addition, changes 704 include changes to metadata associated with objects, where each object may be associated with a set of metadata. For example, each object may be associated with a description, location, names, and tags. The location could be used to identify to which object in the image the metadata refers. For example, the location could include parameters such as coordinates or dimensions of the object or a shape such as a box or circle around the object. In this example, object 704a is associated with change 706. The object does not currently have a description, location, name, or tag. For example, the object may have just been detected. The recommended change is to change the description to "cat," location to "x," names to "Socks," and Tags to "cat, Socks." For example, the object may have been detected as a cat and recognized as the cat "Socks." As shown, the object name "Socks" is shown on the image as change 706.

Object 704b has been identified as a cat at location y. However, the cat has not been recognized. The recommended change is to change the description to "cat," location to "y," and tags to "cat." Object 704c is currently identified as an object at location "z" with tag "Otto." For example, the user may have previously tagged the object "Otto." After generating changes (e.g., after 202), the object has been identified as a car. For example, the user may have a car named "Otto," which may have misled the change generator to believe that the object is a car. As such, the recommended change is to add the description "car" and the tag "car" to the object. In this case, the user may modify the recommended change or choose not to implement the change. For example, the user may select (e.g., click on) the recommended description and change it to "bike." Alternatively, the user may select change 712 on the image and change the text from "car" to "bike," which would also change the metadata description to "bike." The user may also change the tags to "Otto, bike" or to "Otto." Although suggested tags are not shown in image 700, in some embodiments, suggested tags are shown on the image. In such embodiments, the user may change the suggested tags on the image (e.g., by double clicking on the image). In another example, the location may be changed. For example, if object 704b was automatically detected at location y, the user may widen the area that encircles the object if part of the object was cut off in the photo.

Once the user has reviewed and modified the recommended changes, the user may choose to apply the changes. This may be done in various ways depending on the interface. For example, a "Go," "Apply," or "Implement" button may be selected. In some embodiments, the user may selectively implement the changes. For example, the user may select a subset of the recommended changes and apply them. The user may want to preview those changes and undo them if the user does not like them. In some embodiments, the changes may be previewed in other ways. For example, a preview button may be available for each displayed change or for a selected number of changes. After viewing the preview, the user may then select an implement button to implement the change(s).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of editing an image file, including:

analyzing an image file in which an image is stored to obtain a plurality of machine recommended changes that includes (1) a graphical change to one or more regions in the image and (2) a metadata change to metadata associated with the image;

simultaneously displaying, on a same display without implementing the machine recommended changes, (1) a written description of the machine recommended graphical change and (2) an indication of the one or more regions in the image which would be affected by the machine recommended graphical change if the machine recommended graphical change was implemented;

displaying, without implementing the machine recommended metadata change, a written description of the machine recommended metadata change, including by displaying a metadata field and a suggested metadata value for the metadata field, wherein the machine recommended metadata change includes a description of an object depicted in and detected from the image, wherein the description of the object includes identifying information that identifies the object by name or by type of object, and wherein the machine recommended metadata change does not affect the visual presentation of the image;

receiving an indication that a user has modified at least one of the machine recommended changes; and implementing the at least one modified machine recommended change, wherein implementing is performed by a processor.

2. A method as recited in claim 1, wherein at least one of the plurality of machine recommended changes comprises a metadata change, wherein metadata comprises text that describes the image file.

3. A method as recited in claim 1, wherein displaying an indication of machine recommended changes can be toggled on or off.

4. A method as recited in claim 1, wherein displaying includes providing a parameter associated with a machine recommended change.

5. A method as recited in claim 1, wherein displaying includes providing a preview of a machine recommended change.

6. A method as recited in claim 1, wherein displaying includes providing a preview of a machine recommended change, wherein the preview can be toggled on or off.

7. A method as recited in claim 1, wherein receiving an indication that a user has modified at least one of the machine recommended changes includes receiving an indication that the user has rejected a machine recommended change.

8. A method as recited in claim 1, wherein receiving an indication that a user has modified at least one of the machine recommended changes includes receiving an indication that the user has changed a specified region associated with the machine recommended change.

9. A method as recited in claim 1, wherein at least one of the plurality of machine recommended changes include changes to one or more of the following: lighting level, color balance, contrast, saturation, sharpness, red eye, skin tone, a face, and an object.

10. A system for editing an image file, including:

a processor; and a memory coupled with the processor, wherein the memory provides the processor with instructions which when executed cause the processor to:

analyze an image file in which an image is stored to obtain a plurality of machine recommended changes that includes (1) a graphical change to one or more regions in the image and (2) a metadata change to metadata associated with the image;

simultaneously display, on a same display without implementing the machine recommended changes, (1) a written description of the machine recommended graphical change and (2) an indication of one or more regions in the image which would be affected by the machine recommended graphical change if the machine recommended graphical change was implemented;

display, without implementing the machine recommended metadata change, a written description of the machine recommended metadata change, including by displaying a metadata field and a suggested metadata value for the metadata field, wherein the machine recommended metadata change includes a description of an object depicted in and detected from the image, wherein the description of the object includes identifying information that identifies the object by name or by type of object, and wherein the machine recommended metadata change does not affect the visual presentation of the image;

receive an indication that a user has modified at least one of the machine recommended changes; and implement the at least one modified machine recommended change.

11. A non-transitory computer readable medium and comprising computer instructions for:

analyzing an image file in which an image is stored to obtain a plurality of machine recommended changes that includes (1) a graphical change to one or more regions in the image and (2) a metadata change to metadata associated with the image;

simultaneously displaying, on a same display without implementing the machine recommended changes, (1) a written description of the machine recommended graphical change and (2) an indication of the one or more regions in the image which would be affected by the machine recommended graphical change if the machine recommended graphical change was implemented;

displaying, without implementing the machine recommended metadata change, a written description of the machine recommended metadata change, including by displaying a metadata field and a suggested metadata value for the metadata field, wherein the machine recommended metadata change includes a description of an object depicted in and detected from the image, wherein the description of the object includes identifying information that identifies the object by name or by type of object, and wherein the machine recommended metadata change does not affect the visual presentation of the image;

receiving an indication that a user has modified at least one of the machine recommended changes; and implementing the at least one modified machine recommended change.

12. A method as recited in claim 1, wherein at least one of the machine recommended changes is generated based at least in part on previous user behavior.

13. A method as recited in claim 5, wherein previous user behavior includes the user identifying one or more faces or objects.

14. A method as recited in claim 1 wherein displaying a written description of the metadata change further includes displaying a current metadata value for the metadata field.

15. A system as recited in claim 10, wherein the instructions for displaying a written description of the metadata change further include instructions for displaying a current metadata value for the metadata field.

16. A non-transitory computer readable medium as recited in claim 4, wherein the computer instructions for displaying a written description of the metadata change further include computer instructions for displaying a current metadata value for the metadata field.

17. A method as recited in claim 1, wherein the machine recommended metadata change includes at least one of the following: a time at which the image was taken, a description of a location where the image was taken, or a description of a relative position of an object within the image.

18. A system as recited in claim 10, wherein the machine recommended metadata change includes at least one of the following: a time at which the image was taken, a description of a location where the image was taken, or a description of a relative position of an object within the image.

19. A non-transitory computer readable medium as recited in claim 4, wherein the machine recommended metadata change includes at least one of the following: a time at which the image was taken, a description of a location where the image was taken, or a description of a relative position of an object within the image.

20. A method as recited in claim 1, wherein the machine recommended metadata change includes at least one of the following: a tag or a name.

21. A system as recited in claim 10, wherein the machine recommended metadata change includes at least one of the following: a tag or a name.

22. A non-transitory computer readable medium as recited in claim 4, wherein the machine recommended metadata change includes at least one of the following: a tag or a name.

* * * * *